US006919978B2

(12) United States Patent
Kudo (10) Patent No.: US 6,919,978 B2
(45) Date of Patent: Jul. 19, 2005

(54) OPTICAL SCANNING DEVICE AND IMAGE FORMING APPARATUS USING THE SAME

(75) Inventor: Genichiro Kudo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 10/461,480

(22) Filed: Jun. 16, 2003

(65) Prior Publication Data

US 2003/0234968 A1 Dec. 25, 2003

(30) Foreign Application Priority Data

Jun. 20, 2002 (JP) .......................................... 2002-179633

(51) Int. Cl.$^7$ ............................................. G02B 26/08
(52) U.S. Cl. ...................................................... 359/204
(58) Field of Search ................................ 359/204–207, 359/216–219; 347/234, 235, 243

(56) References Cited

U.S. PATENT DOCUMENTS

| | | | | |
|---|---|---|---|---|
| 5,930,020 A | * | 7/1999 | Mochizuki | ................... 359/204 |
| 6,317,244 B1 | | 11/2001 | Ishibe | ......................... 359/204 |
| 6,376,837 B1 | * | 4/2002 | Itabashi et al. | ............. 347/236 |
| 6,476,955 B1 | | 11/2002 | Yoshida | ....................... 359/204 |

FOREIGN PATENT DOCUMENTS

JP         2002-131664         9/2002

* cited by examiner

*Primary Examiner*—Euncha P. Cherry
(74) *Attorney, Agent, or Firm*—Fitzpatrick, Cella, Harper & Scinto (57) ABSTRACT

To obtain an optical scanning device in which timing of a scanning start position on a surface to be scanned (hereinafter referred to as object surface) is stabilized and detection precision of a synchronous signal by a synchronous position detecting unit is improved, with the result that an image with higher definition can be obtained. The optical scanning device includes an aperture stop for limiting a light flux width of a plurality of light fluxes, an optical deflector for deflecting the light fluxes passing through the aperture stop, a scanning optical system for guiding the plurality of light fluxes deflected by the optical deflector onto an object surface, and a synchronous position detecting unit for detecting the plurality of light fluxes deflected by the optical deflector to obtain the synchronous signal, which includes a synchronous detection element, and in the optical scanning device, the synchronous position detecting unit further includes an imaging element and a synchronous position determining unit for determining a light flux position in a main scanning direction on the synchronous detection element disposed in an imaging position of the imaging element or vicinities thereof, and a conjugate point of the imaging element with the synchronous position determining unit is set between a deflection surface of the optical deflector and the aperture stop within a sub-scanning section.

10 Claims, 8 Drawing Sheets

OPTICAL SCANNING DEVICE AND IMAGE FORMING APPARATUS USING THE SAME

BACKGROUND OF THE INVENTION

1. Field of the Invention

The present invention relates to an optical scanning device and an image forming apparatus using the same. In particular, the present invention relates to an optical scanning device suitable to an image forming apparatus having, for example, an electrophotographic process such as a laser beam printer, a digital copying machine, or a multifunction printer. The image forming apparatus is structured such that a plurality of light fluxes (light beams) emitted from a light source means including a plurality of light emitting sections are deflected by a polygon mirror as an optical deflector and then a surface to be scanned (hereinafter referred to as object surface) is scanned with the deflected light fluxes through a scanning lens system having an fθ characteristic to record image information.

2. Related Background Art

Up to now, in an optical scanning device used for an image forming apparatus such as a laser beam printer, a digital copying machine, or a multifunction printer, a light flux emitted from a light source means is guided to an optical deflector by an incident optical system. The light flux deflected by the optical deflector is imaged in a spot shape onto a photosensitive drum surface as an object surface by a scanning lens system, so that the photosensitive drum surface is scanned with the light flux.

In such an optical scanning device, in order to accurately control a write start position of an image on the photosensitive drum surface, a synchronous position detecting unit (BD optical system) as described below is generally provided in a position immediately before the write start of an image signal.

Figure 6:
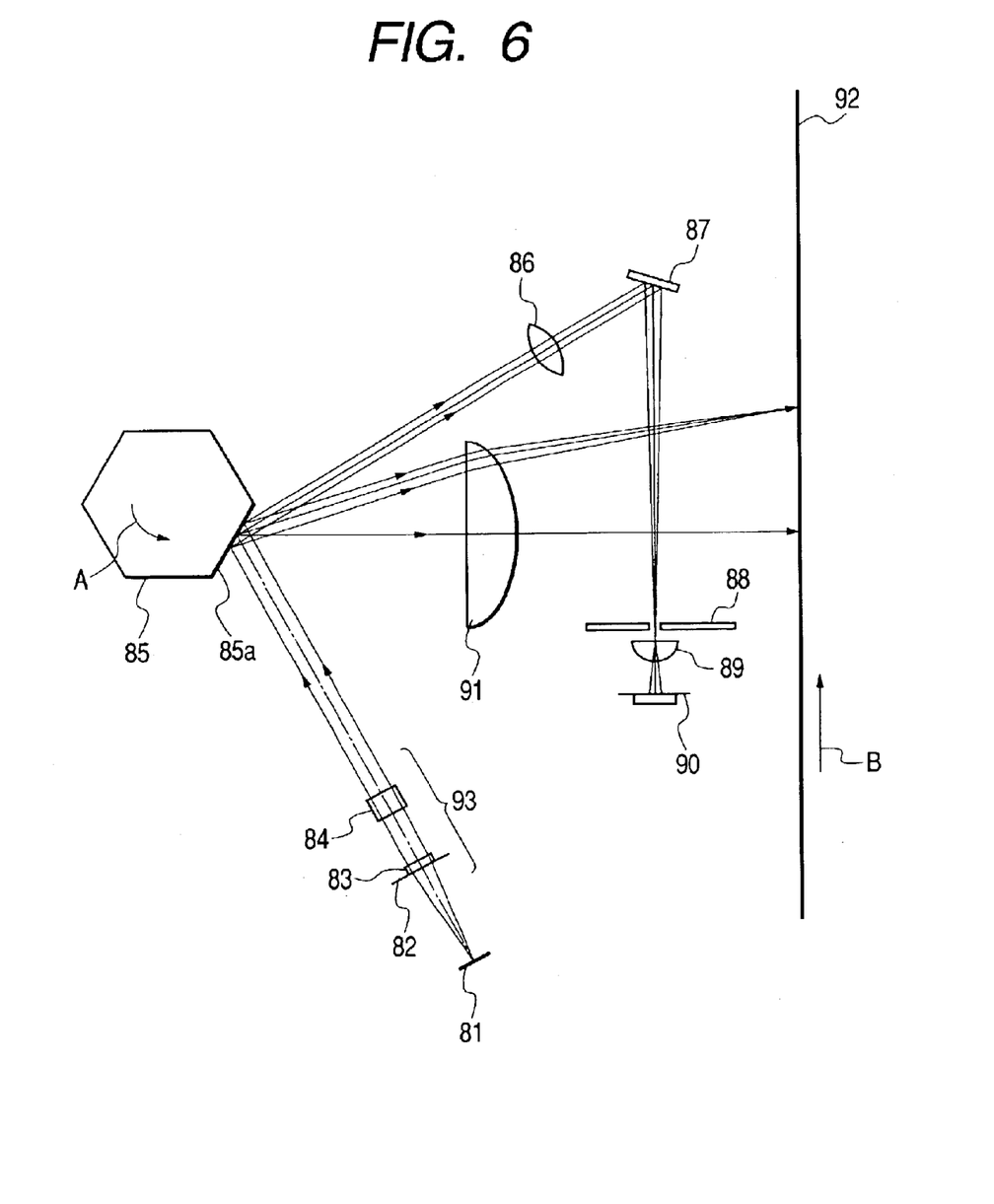
FIG. 6 is a main part sectional view (main scanning sectional view) of a conventional optical scanning device.
Figure 7A:
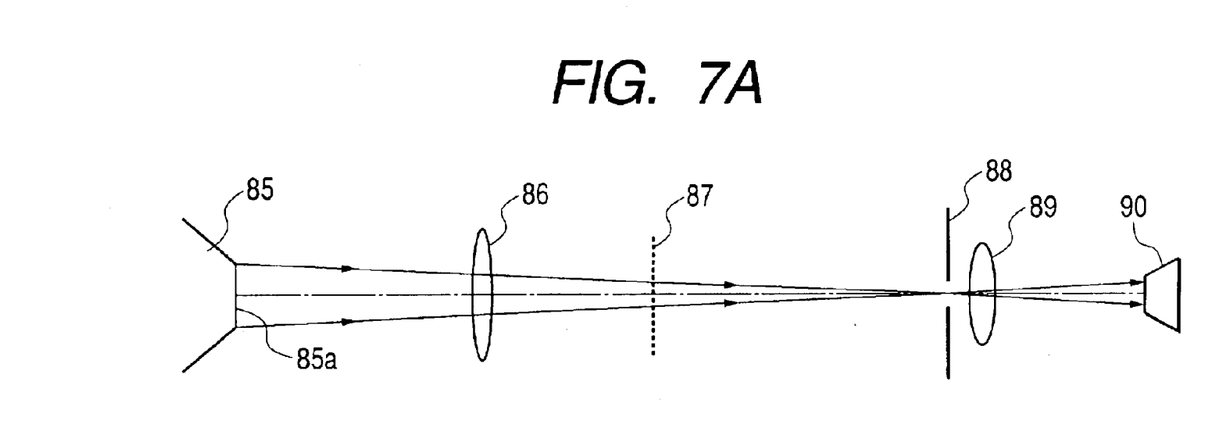
FIG. 7A is a main scanning sectional view of a BD optical path in the conventional optical scanning device.
Figure 7B:
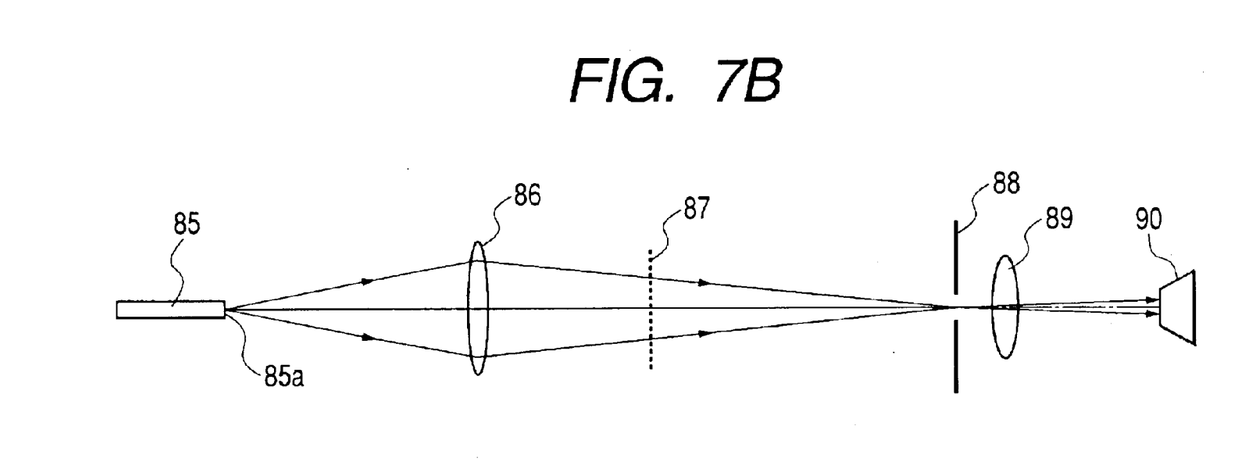
FIG. 7B is a sub-scanning sectional view of the BD optical path in the conventional optical scanning device.

FIG. 6 is a main part sectional view of a conventional optical scanning device including a synchronous position detecting unit in a main scanning direction (main scanning sectional view). FIGS. 7A and 7B are each a main part sectional view when only an optical path of a light flux traveling to the synchronous position detecting unit in FIG. 6 is developed. FIG. 7A is a main scanning sectional view and FIG. 7B is a sub-scanning sectional view. In FIGS. 7A and 7B, a solid line indicates a light flux.

In FIG. 6, a light source means 81 is composed of, for example, a semiconductor laser. An aperture stop 82 forms a light flux emitted from the light source means 81 in a desired optimum beam shape. A collimator lens 83 changes the light flux passing through the aperture stop 82 into a substantially parallel light flux (divergent light flux or convergent light flux). A cylindrical lens 84 has a predetermined refracting power only in the sub-scanning direction. Note that each of elements such as the aperture stop 82, the collimator lens 83, and the cylindrical lens 84 corresponds to an element of an incident optical system 93.

An optical deflector 85 is composed of, for example, a rotating polygonal mirror (polygon mirror) and rotated in a direction indicated by an arrow A in FIG. 6 at a constant speed by a drive unit such as a motor (not shown). A single fθ lens (scanning lens) 91 with an fθ characteristic has a tilt correction function in which a conjugate relationship is made between the vicinity of a deflection surface 85a of the optical deflector 85 and the vicinity of a photosensitive drum surface 92 as an object surface within the sub-scanning section.

An imaging lens for synchronous detection (hereinafter referred to as BD lens) 86 images a synchronous signal detecting light flux (BD light flux) for adjusting timing of a scanning start position on the photosensitive drum surface 92 onto the surface of a BD slit 88 described later within the main scanning section. In addition, the imaging lens has a so-called surface tilt correction function in which the tilt of the deflection surface of the optical deflector 85 is corrected within the sub-scanning section.

A reflecting mirror for synchronous detection (hereinafter referred to as BD mirror) 87 reflects a BD light flux to a synchronous detection element 90 described later. A slit for synchronous detection (hereinafter referred to as BD slit) 88 is disposed in a position equivalent to the photosensitive drum surface 92.

A conjugate lens for synchronous detection (hereinafter referred to as BD conjugate lens) 89 is composed of a co-axial lens (spherical lens) in which a curvature in the main scanning direction is equal to that in the sub-scanning direction. In order to correct the surface tilt of the BD mirror 87 within the sub-scanning section, the conjugate lens is disposed such that the surface of the synchronous detection element 90 and the surface of the BD mirror 87 become a substantially conjugate relationship within the main scanning section and the sub-scanning section.

The synchronous detection element 90 is an optical sensor (hereinafter referred to as BD sensor). In FIG. 6, timing of the scanning start position for image recording on the photosensitive drum surface 92 is adjusted based on a synchronous signal (BD signal) obtained by detecting an output signal from the BD sensor 90.

Note that each of elements such as the BD lens 86, the BD mirror 87, the BD slit 88, the BD conjugate lens 89, and the BD sensor 90 corresponds to an element of the synchronous position detecting unit (BD optical system).

As shown in FIG. 7B, the above-mentioned BD lens 86 is set such that a conjugate point with the BD slit (BD slit surface) 88 is located on the deflection surface 85a within the sub-scanning section. Therefore, for example, when a multi-beam laser having a plurality of light emitting points is used as a light source means, heights of respective BD light fluxes crossing the BD slit 88 in the sub-scanning direction are different from one another. Accordingly, a time interval of the respective BD light fluxes reaching the BD sensor 90 is different from a design value by an influence of an error of straight travel property resulting from a manufacturing error of the BD slit 88, so that a variation in write start position (write start jitter) on the photosensitive drum surface 92 is caused.

Also, when it is structured such that a conjugate point with the BD slit 88 is located in the aperture stop 82 for determining a beam diameter on the photosensitive drum surface 92, the heights of the respective BD light fluxes crossing the BD slit 88 in the sub-scanning direction are equal to one another. Therefore, the influence of the error of straight travel property resulting from the manufacturing error of the BD slit 88 can be reduced. However, the spot diameter on the surface of the BD sensor 90 becomes too large, so that the amount of BD light flux incident to the surface of the BD sensor 90 becomes smaller. Accordingly, the following problem is caused. In other words, a response characteristic of the BD sensor 90 is deteriorated, so that a variation in the amount of respective BD light flux is easy to detect, thereby causing a jitter.

SUMMARY OF THE INVENTION

An object of the present invention is to provide an optical scanning device in which timing of a scanning start position on an object surface is stabilized and detection precision of a synchronous signal by the synchronous position detecting unit is improved, with the result that an image with higher definition can be obtained.

Further, another object of the present invention is to provide an optical scanning device capable of reducing a color shift caused in an image forming apparatus including a plurality of optical scanning devices.

That is, the present invention provides an optical scanning device comprising an aperture stop for limiting a light flux width of a plurality of light fluxes, an optical deflector for deflecting the light fluxes passing through the aperture stop, a scanning optical system for guiding the plurality of light fluxes deflected by the optical deflector onto a surface to be scanned (hereinafter referred to as object surface), and synchronous position detecting means for detecting the plurality of light fluxes deflected by the optical deflector to obtain a synchronous signal, which includes a synchronous detection element, wherein the synchronous position detecting means further includes an imaging element and synchronous position determining means for determining a light flux position in a main scanning direction on the synchronous detection element disposed in an imaging position of the imaging element or vicinities thereof and a conjugate point of the imaging element with the synchronous position determining means is set between a deflection surface of the optical deflector and the aperture stop within a sub-scanning section.

Preferably, when a beam length of the light fluxes on the synchronous position determining means in a sub-scanning direction is assumed to be Wss and a length of the synchronous position determining means in the sub-scanning direction is assumed to be hs, a condition represented by $$0.05 \times hs \leq Wss \leq 0.8 \times hs$$

is satisfied.

Further, the present invention provides an optical scanning device comprising an aperture stop for limiting a light flux width of a plurality of light fluxes, an optical deflector for deflecting the light fluxes passing through the aperture stop, a scanning optical system for guiding the plurality of light fluxes deflected by the optical deflector onto an object surface and synchronous position detecting means for detecting the plurality of light fluxes deflected by the optical deflector to obtain a synchronous signal, which includes a synchronous detection element, wherein the synchronous position detecting means further includes an imaging element and synchronous position determining means for determining a light flux position in a main scanning direction on the synchronous detection element disposed in an imaging position of the imaging element or vicinities thereof and when a beam length of the light fluxes on the synchronous position determining means in a sub-scanning direction is assumed to be Wss and a length of the synchronous position determining means in the sub-scanning direction is assumed to be hs, a condition represented by $$0.05 \times hs \leq Wss \leq 0.8 \times hs$$

is satisfied.

Preferably, when a distance between an incident surface of the imaging element and the conjugate point with the synchronous position determining means is assumed to be P and a distance between the aperture stop and the incident surface of the imaging element is assumed to be L, a condition represented by $$0.1 \times L \leq P \leq 0.9 \times L$$

is satisfied.

Preferably, the imaging element includes an anamorphic lens.

Preferably, the synchronous detection element is disposed on a separate optical path different from an optical path of the light fluxes traveling to the object surface.

Preferably, the synchronous detection element detects the synchronous signal for each of the plurality of light fluxes.

Further, the present invention provides an optical scanning device comprising an aperture stop for limiting a light flux width of a light flux, an optical deflector for deflecting the light flux passing through the aperture stop, a scanning optical system for guiding the light flux deflected by the optical deflector onto an object surface and synchronous position detecting means for detecting the light flux deflected by the optical deflector to obtain a synchronous signal, which includes a synchronous detection element, wherein the synchronous position detecting means further includes an imaging element and synchronous position determining means for determining a light flux position in a main scanning direction on the synchronous detection element disposed in an imaging position of the imaging element or vicinities thereof and a conjugate point of the imaging element with the synchronous position determining means is set between a deflection surface of the optical deflector and the aperture stop within a sub-scanning section.

DESCRIPTION OF THE PREFERRED EMBODIMENTS

First Embodiment

Figure 1:
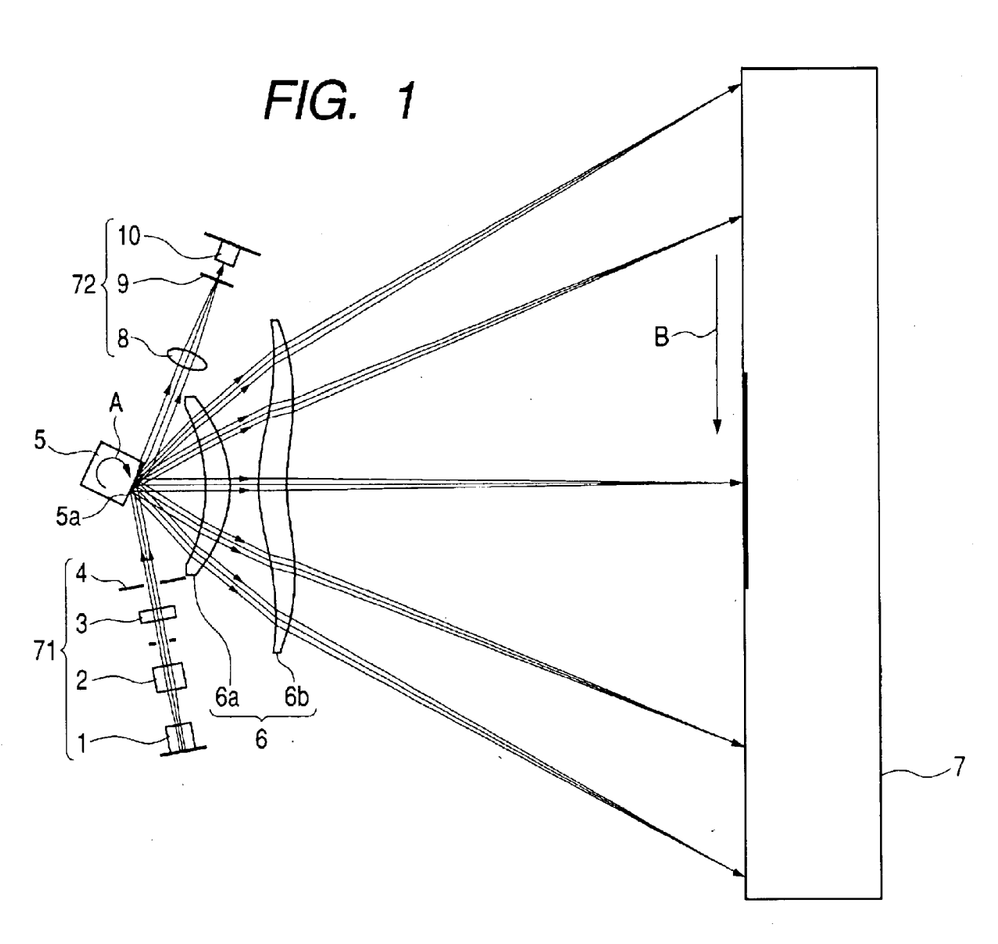
FIG. 1 is a main scanning sectional view of a first embodiment of the present invention.
Figure 2A:
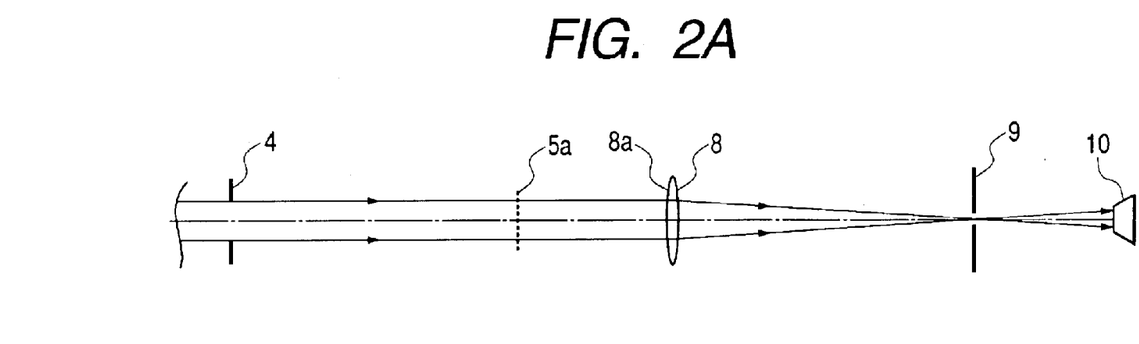
FIG. 2A is a main scanning sectional view showing a BD optical path in the first embodiment and FIG. 2B is a sub-scanning sectional view showing the BD optical path in the first embodiment.
Figure 2B:
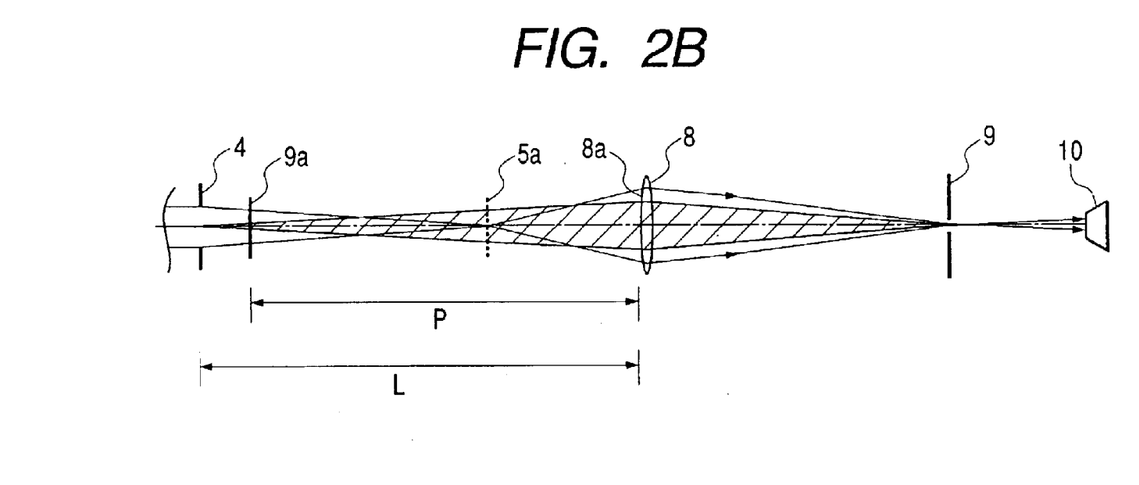

FIG. 1 is a main part sectional view in a main scanning direction (main scanning sectional view), showing a first embodiment of the present invention. FIGS. 2A and 2B are each a main part sectional view when only an optical path of a light flux traveling to a synchronous position detecting unit in FIG. 1 is developed. FIG. 2A is a main part sectional view in the main scanning direction (main scanning sectional view) and FIG. 2B is a main part sectional view in a sub-scanning direction (sub-scanning sectional view). In FIGS. 2A and 2B, a solid line indicates a light flux and a shaded portion indicates a conjugate relationship with respect to an imaging lens 8 for synchronous detection.

Note that, in this specification, a plane formed by the optical axis of a scanning lens system and a light flux deflected by an optical deflector is defined as a main scanning section, and a plane which includes the optical axis of the scanning lens system and is orthogonal to the main scanning section is defined as a sub-scanning section.

In FIG. 1, a light source means 1 is composed of a semiconductor laser including, for example, two light emitting sections (multi-beam laser). Note that the number of light emitting sections may be three or more. A collimator lens 2 changes a light flux emitted from the light source means 1 into a substantially parallel light flux (divergent light flux or convergent light flux). A cylindrical lens 3 has a predetermined refracting power only in the sub-scanning direction. An aperture stop 4 limits a width of two light fluxes emitted from the light source means 1 to determine a spot diameter on an object surface 7.

Note that each of elements such as the collimator lens 2, the cylindrical lens 3, and the aperture stop 4 corresponds to an element of an incident optical unit 71.

An optical deflector 5 is composed of, for example, a polygon mirror (rotating polygonal mirror) and rotated in a direction indicated by an arrow A of FIG. 1 at a constant speed by a drive unit such as a motor (not shown).

A scanning optical system (fθ lens system) 6 has an imaging performance and an fθ characteristic and includes two first and second scanning lenses 6a and 6b. In addition, the scanning optical system has a surface tilt correction function to the optical deflector 5 in which two light fluxes which are reflected and deflected by the optical deflector 5 are imaged onto a photosensitive drum surface 7 as the object surface and a substantially conjugate relationship is made between a deflection surface 5a of the optical deflector 5 or its vicinities and the photosensitive drum surface 7 or its vicinities within the sub-scanning section.

Reference numeral 7 denotes a photosensitive drum surface as an object surface.

An imaging lens for synchronous detection (hereinafter referred to as BD lens) 8 is composed of an anamorphic lens which has different powers (refracting powers) in the main scanning direction and the sub-scanning direction and is produced by plastic molding. According to the imaging lens, as shown in FIGS. 2A and 2B, a synchronous signal detecting light flux (BD light flux) for adjusting timing of a scanning start position on the photosensitive drum surface 7 is substantially imaged as spot light onto the surface of a BD slit 9 to be described later within both the main scanning section and the sub-scanning section.

Figure 8:
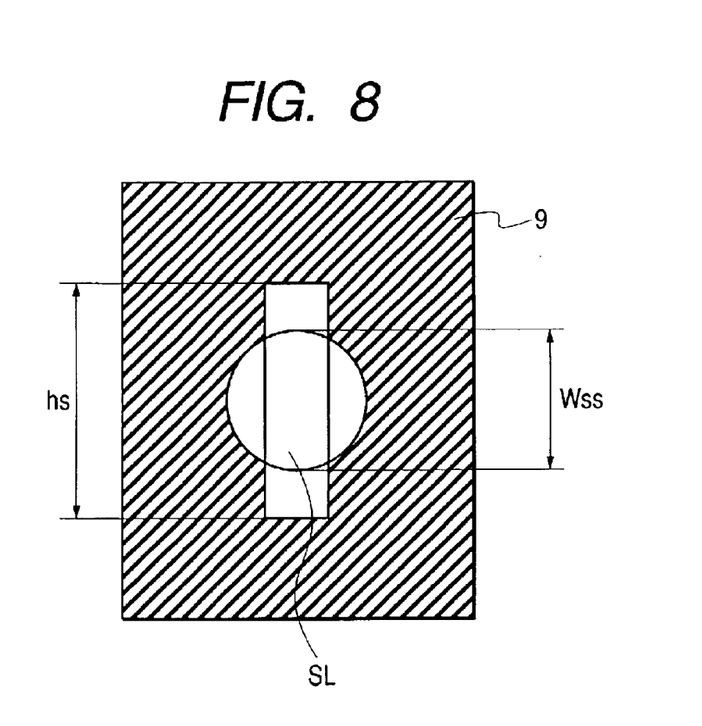
FIG. 8 is an explanatory view showing a BD light flux on a BD slit in the embodiments.

In other words, as shown in FIG. 8, it is set such that the surface of the BD slit 9 is scanned with spot light SL imaged by the BD lens 8 within the main scanning section and a conjugate point 9a with the BD slit (BD slit surface) 9 is located between the deflection surface 5a of the optical deflector 5 and the aperture stop 4 within the sub-scanning section. Therefore, the BD lens has a substantial surface tilt correction function (surface tilt correction system) to the deflection surface 5a of the optical deflector 5 and operates such that heights of the respective BD light fluxes of a multi-beam on the BD slit 9 in the sub-scanning direction are substantially equal to each other. Note that the BD lens 8 may be composed of a plurality of lenses including an anamorphic lens.

The slit for synchronous detection (hereinafter referred to as BD slit) 9 is disposed in an imaging position of the BD lens 8 or its vicinities. The end portions of the BD slit 9 are formed in a knife-edge shape, thereby determining a position in which a spot substantially imaged by the BD lens 8 scanning in the main scanning direction is incident to the surface of a BD sensor 10 to be described later. Note that the reason why the end portions of the BD slit 9 are formed in the knife-edge shape is because BD detection precision in the case where a BD light flux is eclipsed by the knife-edge of the BD slit 9 becomes higher than that in the case where the BD light flux is eclipsed by the end portions of the light receiving surface of the BD sensor 10.

An optical sensor as a synchronous detection element (hereinafter referred to as BD sensor) 10 detects a synchronous signal (BD signal) for each light flux. Timing of a scanning start position for image recording on the photosensitive drum surface 7 is adjusted based on the BD signal obtained by the BD sensor 10. The BD sensor 10 is disposed on a separate optical path different from an optical path of a light flux traveling to the photosensitive drum surface 7 (scanning optical path). In other words, the scanning optical path and an optical path of a light flux traveling to the BD sensor 10 (BD optical path) are each composed of a separate optical path, thereby reducing a size of the entire device.

Note that each of elements such as the BD lens 8, the BD slit 9, and the BD sensor 10 corresponds to an element of a synchronous position detecting unit (BD optical system) 72.

In this embodiment, two light fluxes which are modulated by the light source means 1 according to image information and emitted therefrom are changed into substantially parallel light fluxes by the collimator lens 2, incident to the cylindrical lens 3, and a size of light flux section thereof is determined by the aperture stop 4. Of the light fluxes incident to the cylindrical lens 3, a light flux within the main scanning section is emitted in a natural state. A light flux within the sub-scanning section is converged and imaged as a substantial line image (line image extended in the main scanning direction) onto the deflection surface 5a of the optical deflector 5. Then, the light fluxes which are reflected and deflected on the deflection surface 5a of the optical deflector 5 are imaged in a spot shape onto the photosensitive drum surface 7 by the two first and second scanning lenses 6a and 6b. Here, when the optical deflector 5 is rotated in a direction indicated by the arrow A, the photosensitive drum surface 7 is optically scanned in a direction indicated by an arrow B (main scanning direction) at a constant speed. Therefore, image recording is conducted on the photosensitive drum surface 7 as a recording medium.

At this time, in order to adjust the timing of the scanning start position on the photosensitive drum surface 7 before optically scanning the photosensitive drum surface 7, a portion of each of the light fluxes which are reflected and deflected by the optical deflector 5 is condensed on the surface of the BD slit 9 through the BD lens 8, and then, guided to the BD sensor 10. Then, the timing of the scanning start position for image recording on the photosensitive drum surface 7 is adjusted for each of the BD light fluxes based on the synchronous signal (BD signal) obtained by detecting the output signal from the BD sensor 10.

In this embodiment, the light source means is a multi-beam laser for emitting two light fluxes. Therefore, the BD signals of the respective light fluxes are separately detected, so that a write start position is determined. Assume that a first light flux crossing the BD slit 9 is a BD light flux A and a second light flux crossing it is a BD light flux B. Here, when the BD light flux A is incident to the BD sensor 10 and a write start position signal related to the BD light flux A is detected, the BD light flux A is cut off by an electric circuit which is not shown. Next, a write start position signal related to the BD light flux B crossing the BD sensor 10 is detected. Thus, according to this embodiment, it can be prevented that the two BD light fluxes are simultaneously incident to the BD sensor 10. In addition, high precision BD detection can be conducted by the scanning optical system using the multi-beam laser.

Table 1 shows various numerical values of the synchronous position detecting unit in this embodiment.

TABLE 1

| Optical Components | Positions of the Surface | Radius of Curvature of Main Scanning Direction | Radius of Curvature of Sub-scanning Direction | Distance | Refractive Index |
|---|---|---|---|---|---|
| Aperture Stop | | | | 27.5 | |
| Rotating Polygon | | | | 40.59 | 1 |
| BD-Lens | The 1st Surface | 26.21 | 26.2 | 3.2 | 1.5242 |
| | The 2nd Surface | ∞ | −26.9 | 47.88 | 1 |
| Slit Image Surface | | | | 1 | |

In this embodiment, as shown in Table 1, the BD lens 8 is composed of an anamorphic lens in which a power in the main scanning direction is different from a power in the sub-scanning direction. In addition, the anamorphic lens 8 is set such that a conjugate point 9a with the BD slit (BD slit surface) 9 is located between the aperture stop 4 and the deflection surface 5a of the optical deflector 5 within the sub-scanning section as described above.

Also, in this embodiment, the conjugate point 9a with the BD slit 9 further approaches the aperture stop 4 such that heights Wss of the two BD light fluxes passing through the BD slit 9 in the sub-scanning direction are substantially equal to each other. A shape and a position of the BD lens 8 are determined such that an error of straight travel property generated by, for example, a manufacturing error of the BD slit 9 is reduced.

According to the structure of this embodiment, even if the straight travel property of the BD slit 9 is relatively deteriorated, the two BD light fluxes pass through the BD slit at substantially the same height in the sub-scanning direction. Therefore, there is a merit that a jitter is hard to occur.

In this embodiment, when a distance between a first surface (incident surface) 8a of the BD lens 8 and the conjugate point 9a with the BD slit 9 is assumed to be P and a distance between the aperture stop 4 and the first surface 8a of the BD lens 8 is assumed to be L, respective elements are set such that a condition represented by $$0.1 \times L \leq P \leq 0.9 \times L \quad (1)$$

is satisfied.

The above-mentioned conditional expression (1) defines the distance P between the first surface 8a of the BD lens 8 and the conjugate point 9a with the BD slit 9 and the distance L between the aperture stop 4 and the first surface 8a of the BD lens 8. If they are deviated from the conditional expression (1), a variation in write start position (write start jitter) on the photosensitive drum surface 7 is caused, which is not preferable.

In this embodiment, P is 56.2 mm and L is 68.09 mm (P/L=0.82). Therefore, a relationship, $$0.1 \times 68.09 = 6.81 \leq P \leq 0.9 \times 68.09 = 61.28$$

is obtained. This relationship satisfies the above-mentioned conditional expression (1).

Also, in this embodiment, as shown in FIG. 8, when a beam length (spot length) of the BD light flux on the BD slit 9 in the sub-scanning direction is assumed to be Wss and a length of the BD slit 9 in the sub-scanning direction is assumed to be hs, respective elements are set such that a condition represented by $$0.05 \times hs \leq Wss \leq 0.8 \times hs \quad (2)$$

is satisfied.

The above-mentioned conditional expression (2) relates to the beam length of the BD lens 8 in the sub-scanning direction and the height of the BD slit 9 in the sub-scanning direction. If they are deviated from the conditional expression (2), it is easy to be influenced by the error of the straight travel property of the BD slit 9 in the sub-scanning direction and a jitter deteriorates, which is not preferable.

In this embodiment, because Wss=0.4 mm and hs=2.5 mm (Wss/hs=0.16), a relationship, $$0.05 \times 2.5 = 0.125 \leq Wss \leq 0.8 \times 2.5 = 2.0$$

is obtained. Therefore, this relationship satisfies the above-mentioned conditional expression (2).

Figure 9:
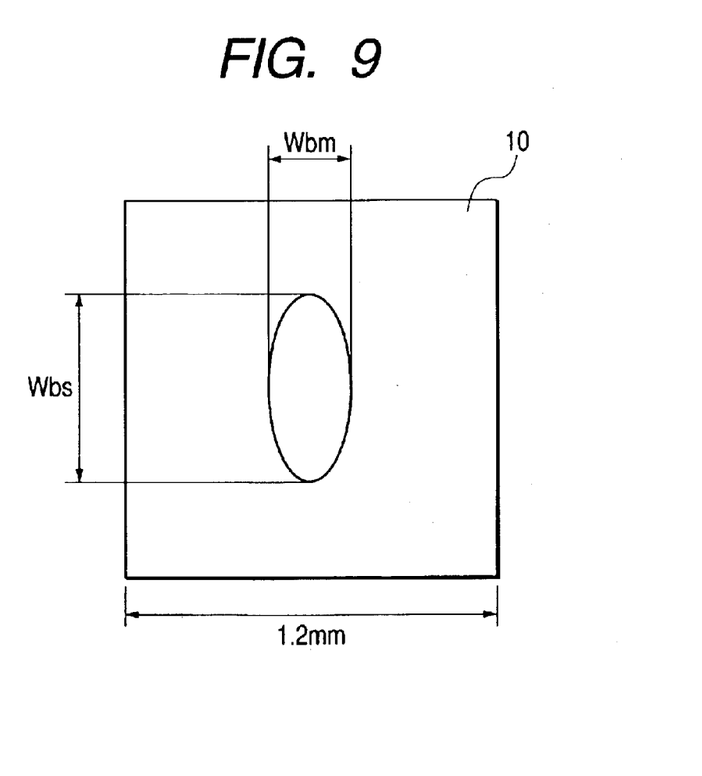
FIG. 9 is an explanatory view showing a spot length on a BD sensor surface in the embodiments.

Also, as shown in FIG. 9, as to a spot length Wbm in the main scanning direction and a spot length Wbs in the sub-scanning direction on the surface of the BD sensor 10, Wbm=0.09 mm, and Wbs=0.6 mm.

The spot lengths Wbm and Wbs are each a length at up to $1/e^2$ of the peak amount of light. In this embodiment, the BD sensor 10 is structured such that an effective area is 1.2 mm or less. Accordingly, an eclipse of the BD light flux incident to the BD sensor 10 is not caused, thereby preventing a reduction in the amount of light.

Also, because the BD light flux is imaged onto the surface of the BD slit 9, a beam diameter on the surface of the BD sensor 10 becomes larger than that on the surface of the BD slit 9. Therefore, there is a merit that a light flux position on the surface of the BD sensor 10 is stabilized and unevenness of sensitivity of the BD sensor 10 is hard to detect.

In this embodiment, as described above, the BD lens 8 is composed of an anamorphic lens having different powers in the main scanning direction and the sub-scanning direction. In addition, the conjugate point 9a of the BD lens 8 with the BD slit 9 is set between the aperture stop 4 and the deflection surface 5a of the optical deflector 5. Therefore, the detection precision of the synchronous signal by the BD sensor 10 is improved, with the result that an image with high definition can be obtained.

Note that, in this embodiment, the BD lens 8 and the first scanning lens 6a composing the scanning lens system 6 are separately provided. However, they may be integrally formed.

Also, in this embodiment, the scanning lens system 6 is composed of two lenses. However, the present invention is not limited to such a structure. The scanning lens system may be composed of, for example, a single lens or three or more lenses.

In this embodiment, a monolithic multi semiconductor laser 1 having two light emitting points is used as the light source means 1. However, the light source means 1 is not limited to this. A monolithic multi semiconductor laser having three or more light emitting points may be used. In addition, when the monolithic multi semiconductor laser having three or more light emitting points is used, an embodiment in which at least two BD light fluxes of three or more BD light fluxes are detected is within the scope of right of the present invention. Of course, an embodiment in which all of three or more BD light fluxes are detected is within the scope of right of the present invention.

Also, a beam synthetic system in which at least two monolithic single semiconductor lasers are combined with a beam splitter and the like is within the scope of right of the present invention.

Further, an optical system in which the BD lens 8 is replaced by a diffraction system or a power mirror is within the scope of right of the present invention.

Furthermore, a surface light emitting laser in which three or more light emitting points are arranged in a two dimensional form such as a rectangle or a parallelogram is within the scope of right of the present invention.

Second Embodiment

Figure 3A:
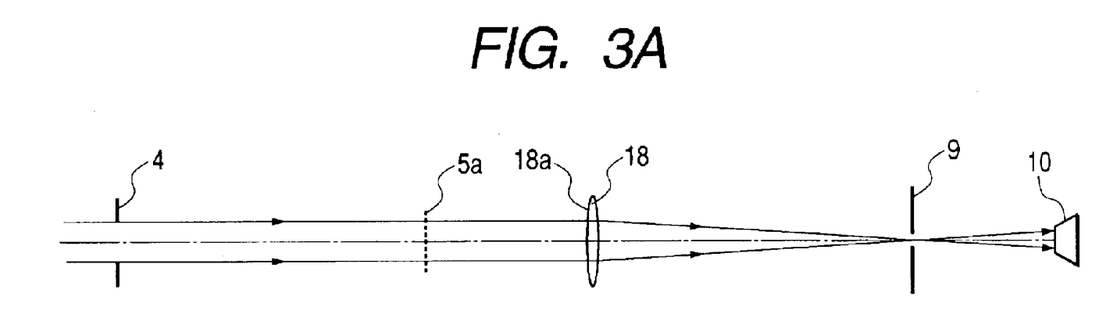
FIG. 3A is a main scanning sectional view showing a BD optical path in a second embodiment and FIG. 3B is a sub-scanning sectional view showing the BD optical path in the second embodiment.
Figure 3B:
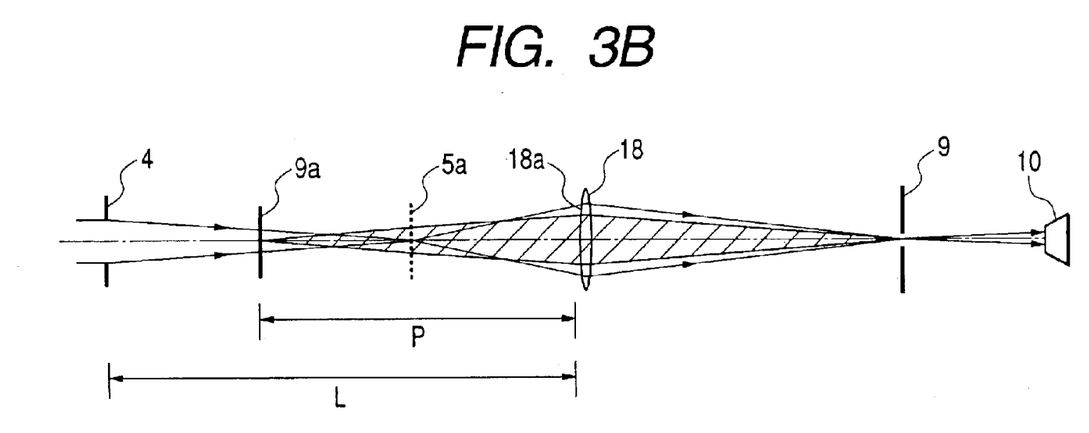

FIGS. 3A and 3B are each a main part sectional view when only an optical path of a light flux traveling to a synchronous position detecting unit is developed in a second embodiment of the present invention. FIG. 3A is a main scanning sectional view and FIG. 3B is a sub-scanning sectional view. In FIGS. 3A and 3B, a solid line indicates a light flux and a shaded portion indicates a conjugate relationship with respect to a BD lens. In FIGS. 3A and 3B, the same reference symbols are provided for the same elements as shown in FIGS. 2A and 2B.

This embodiment is different from the first embodiment described above regarding the following point. Respective optical elements of the BD lens 18 are set such that the conjugate point 9a of a BD lens 18 with the BD slit (BD slit surface) 9 within the sub-scanning section is located substantially at a center of the aperture stop 4 and the deflection surface 5a of the optical deflector 5. Other structures and optical operations are substantially the same as those in the first embodiment, thereby producing the same effect.

In other words, in FIGS. 3A and 3B, the BD lens 18 is composed of an anamorphic lens and set such that the conjugate point 9a with the BD slit 9 within the sub-scanning section is located substantially at the center of the aperture stop 4 and the deflection surface 5a of the optical deflector 5.

According to this embodiment, the BD lens 18 is structured as described above. Therefore, the influence of the error of the straight travel property of the BD slit 9 is reduced and a variation in imaging position due to the tilt of the deflection surface 5a is corrected (subjected to surface tilt correction). In addition, according to this embodiment, the configuration is made so that a balance is kept between keeping the surface tilt correction function with a preferable state and reducing the influence of the error of the straight travel property of the BD slit 9 in the sub-scanning direction.

Table 2 shows various numerical values of the synchronous position detecting unit in this embodiment.

TABLE 2

| Optical Components | Positions of the Surface | Radius of Curvature of Main Scanning Direction | Radius of Curvature of Sub-scanning Direction | Distance | Refractive Index |
|---|---|---|---|---|---|
| Aperture Stop | | | | 27.5 | |
| Rotating Polygon | | | | 40.59 | 1 |
| BD-Lens | The 1st Surface | 26.21 | 26.21 | 3.2 | 1.5242 |
| | The 2nd Surface | ∞ | −16.58 | 47.88 | 1 |
| Slit BD-Sensor Surface | | | | 1 | |

In this embodiment, as compared with the first embodiment described above, a radius of curvature of the second surface (exit surface) of the BD lens 18 in the sub-scanning direction is changed to shift the conjugate point 9a with the BD slit 9. The conjugate point can be shifted only by changing the arrangement of the BD lens, the BD slit, and the BD sensor. In this case, there is a merit that the same BD lens 8 as that in the first embodiment can be used.

In this embodiment, a distance P between the conjugate point 9a with the BD slit 9 and a first surface 18a of the BD lens 18 is 34 mm and a distance L between the aperture stop 4 and the first surface 18a of the BD lens 18 is 68.09 mm (P/L=0.5). Therefore, a relationship, $$0.1 \times 68.09 = 6.81 \leq P \leq 0.9 \times 68.09 = 61.28$$

is obtained. This relationship satisfies the above-mentioned conditional expression (1).

Also, in this embodiment, a spot length Wss on the BD slit 9 in the sub-scanning direction is 0.3 mm and a height hs of the BD slit 9 in the sub-scanning direction is 2.5 mm (Wss/hs=0.12). Therefore, a relationship, $$0.05 \times 2.5 = 0.125 \leq Wss \leq 0.8 \times 2.5 = 2.0$$

is obtained. This relationship satisfies the above-mentioned conditional expression (2).

Also, as to a spot length Wbm in the main scanning direction and a spot length Wbs in the sub-scanning direction on the surface of the BD sensor 10, Wbm=0.08 mm, and Wbs=0.4 mm.

In this embodiment, the BD sensor 10 is structured such that an effective area is 1.2 mm or less. Accordingly, an eclipse of the BD light flux incident to the BD sensor 10 is not caused, thereby preventing a reduction in the amount of light.

Third Embodiment

Figure 4A:
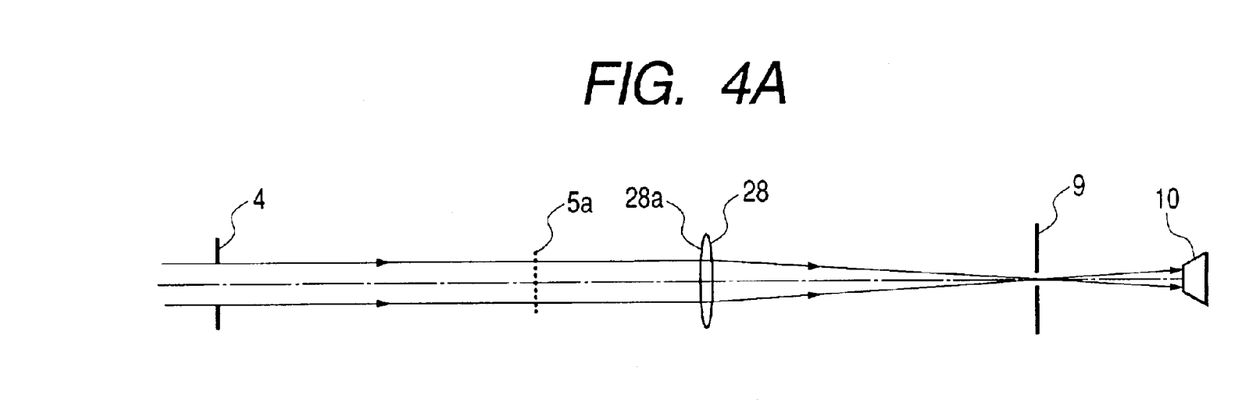
FIG. 4A is a main scanning sectional view showing a BD optical path in a third embodiment and FIG. 4B is a sub-scanning sectional view showing the BD optical path in the third embodiment.
Figure 4B:
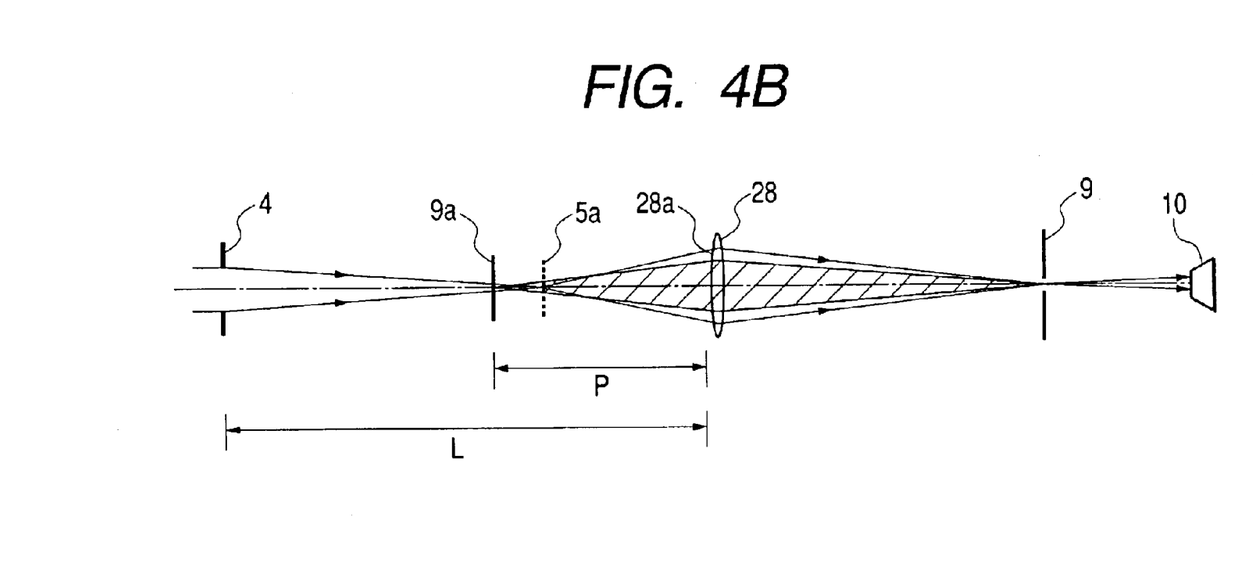

FIGS. 4A and 4B are each a main part sectional view when only an optical path of a light flux traveling to a synchronous position detecting unit is developed in a third embodiment of the present invention. FIG. 3A is a main scanning sectional view and FIG. 3B is a sub-scanning sectional view. In FIGS. 3A and 3B, a solid line indicates a light flux and a shaded portion indicates a conjugate relationship with respect to a BD lens. In FIGS. 3A and 3B, the same reference symbols are provided for the same elements as shown in FIGS. 2A and 2B.

This embodiment is different from the second embodiment described above regarding the following point. Respective optical elements of the BD lens 28 are set such that the conjugate point 9a of a BD lens 28 with the BD slit (BD slit surface) 9 within the sub-scanning section is located between the aperture stop 4 and the deflection surface 5a of the optical deflector 5 in the deflection surface 5a side. Other structures and optical operations are substantially the same as those in the second embodiment, thereby producing the same effect.

In other words, in FIGS. 4A and 4B, the BD lens 28 is composed of an anamorphic lens and set such that the conjugate point 9a with the BD slit 9 within the sub-scanning section is located between the aperture stop 4 and the deflection surface 5a of the optical deflector 5 in a position nearer the deflection surface 5a side.

According to this embodiment, the BD lens 28 is structured as described above. Therefore, the influence of the error of the straight travel property of the BD slit 9 is reduced and a variation in imaging position due to the tilt of the deflection surface 5a is corrected (subjected to surface tilt correction). In addition, according to this embodiment, the influence of the error of the straight travel property of the BD slit 9 in the sub-scanning direction is reduced. Therefore, the configuration is made with emphasis on keeping the surface tilt correction function with a preferable state.

Table 3 shows various numerical values of the synchronous position detecting unit in this embodiment.

TABLE 3

| Optical Components | Positions of the Surface | Radius of Curvature of Main Scanning Direction | Radius of Curvature of Sub-scanning Direction | Distance | Refractive Index |
|---|---|---|---|---|---|
| Aperture Stop | | | | 34.5 | |
| Rotating Polygon | | | | 50.6 | 1 |
| BD-Lens | The 1st Surface | 26.21 | 26.21 | 3.2 | 1.5242 |
| | The 2nd Surface | ∞ | −16.58 | 47.88 | 1 |
| Slit | | | | 1 | |
| BD-Sensor Surface | | | | | |

In this embodiment, a distance P between the conjugate point 9a with the BD slit 9 and a first surface 28a of the BD lens 28 is 17.0 mm and a distance L between the aperture stop 4 and the first surface 28a of the BD lens 28 is 68.09 mm (P/L=0.25). Therefore, a relationship, $$0.1 \times 68.09 = 6.81 \leq P \leq 0.9 \times 68.09 = 61.28$$

is obtained. This relationship satisfies the above-mentioned conditional expression (1).

Also, in this embodiment, a spot length Wss on the BD slit 9 in the sub-scanning direction is 0.4 mm and a height hs of the BD slit 9 in the sub-scanning direction is 2.5 mm (Wss/hs=0.16). Therefore, a relationship, $$0.05 \times 2.5 = 0.125 \leq Wss \leq 0.8 \times 2.5 = 2.0$$

is obtained. This relationship satisfies the above-mentioned conditional expression (2).

Also, as to a spot length Wbm in the main scanning direction and a spot length Wbs in the sub-scanning direction on the surface of the BD sensor 10, Wbm=0.08 mm, and Wbs=0.4 mm.

In this embodiment, the BD sensor 10 is structured such that an effective area is 1.2 mm or less. Accordingly, an eclipse of the BD light flux incident to the BD sensor 10 is not caused, thereby preventing a reduction in the amount of light.

Note that, in each of the embodiments, the respective elements are provided such that (a) the conjugate point of the BD lens with the BD slit is set between the deflection surface of the optical deflector and the aperture stop and (b) the conditional expression (2) is satisfied. If one of the conditions (a) and (b) is satisfied, a desirable effect is produced.

Note that, in each of the embodiments, it is further preferable that the conditional expressions (1) and (2) are set as follows. That is, $$0.15 \times L \leq P \leq 0.85 \times L \tag{1a}$$

and $$0.08 \times hs \leq Wss \leq 0.3 \times hs \tag{2a}$$

Color Image Forming Apparatus

Figure 5:
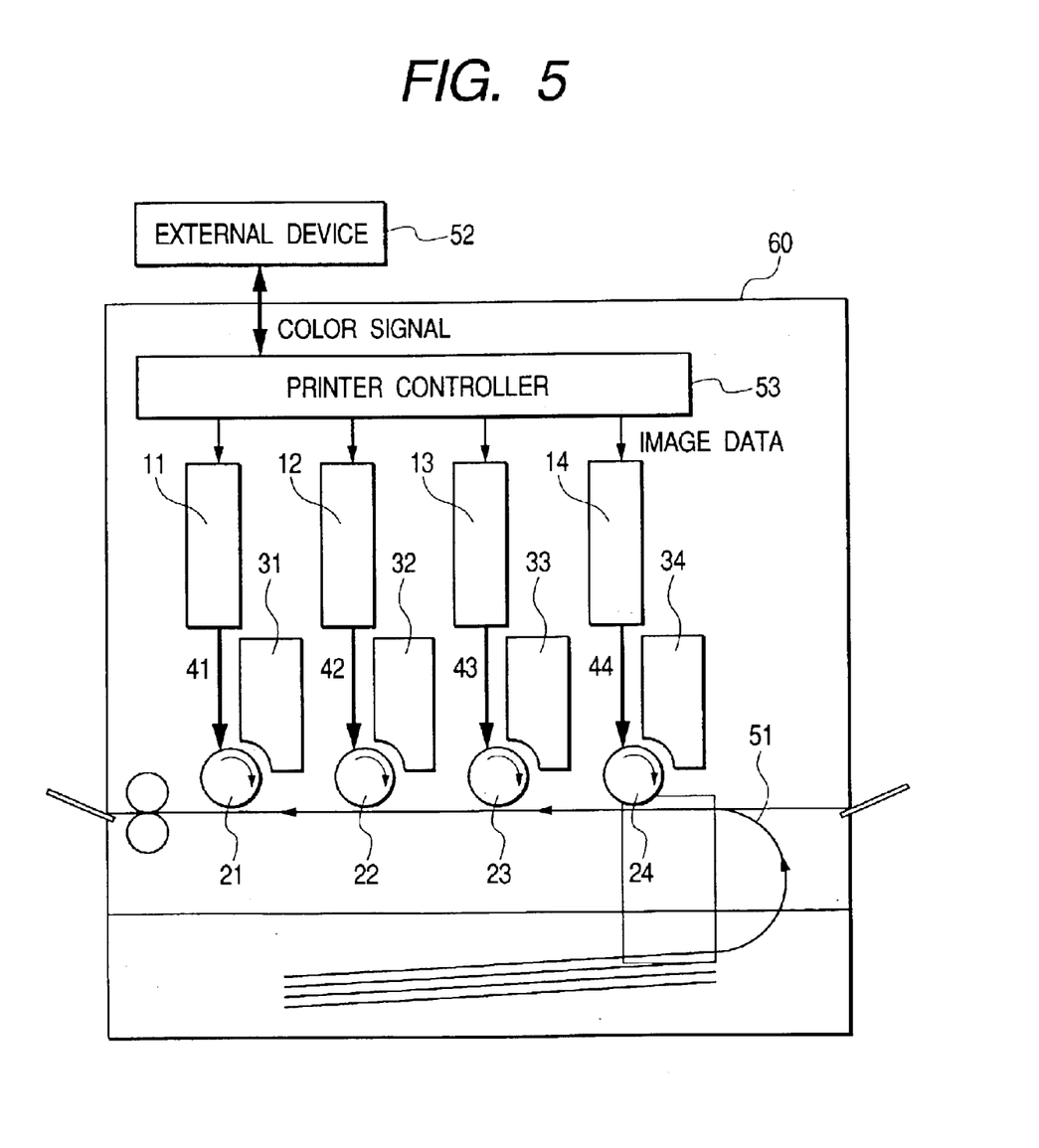
FIG. 5 is a main part sectional diagram in a sub-scanning direction, showing an embodiment of a color image forming apparatus of the present invention.

FIG. 5 is a main part schematic diagram of a color image forming apparatus according to an embodiment of the present invention. This embodiment is a tandem type color image forming apparatus in which four optical scanning devices (light scanning optical system) are arranged and image information is recorded on a photosensitive drum surface as an image bearing member by the optical scanning devices at the same time. In FIG. 5, a color image forming apparatus 60 includes optical scanning devices 11, 12, 13, and 14 having any one of structures described in the first, second, and third embodiments, photosensitive drums 21, 22, 23, and 24 as image bearing members, developing units 31, 32, 33, and 34, a conveyor belt 51, and a printer controller 53. Note that, in FIG. 5, the color image forming apparatus 60 includes a transferring unit for transferring a toner image developed by a developing unit to a material to be transferred (not shown) and a fixing unit for fixing the transferred toner image to the material to be transferred (not shown).

In FIG. 5, respective color signals of R (red), G (green), and B (blue) are input from an external device 52 such as a personal computer to the color image forming apparatus 60. These color signals are converted into respective image data of C (cyan), M (magenta), Y (yellow), and B (black) (dot data) by the printer controller 53 in the apparatus. These image data are input to each of the optical scanning devices 11, 12, 13, and 14. Then, light beams 41, 42, 43, and 44 modulated according to the respective image data are emitted from the optical scanning devices 11, 12, 13, and 14. Therefore, the photosensitive surfaces of the photosensitive drums 21, 22, 23, and 24 are scanned with these light beams in the main scanning direction.

According to the color image forming apparatus of this embodiment, the four optical scanning devices (11, 12, 13, and 14) are arranged corresponding to the respective colors of C (cyan), M (magenta), Y (yellow), and B (black), image signals (image information) are recorded on the surfaces of the photosensitive drums 21, 22, 23, and 24 by them at the same time, thereby printing a color image at a high speed.

According to the color image forming apparatus of this embodiment, as described above, latent images of the respective colors are formed on the respective corresponding surfaces of the photosensitive drums 21, 22, 23, and 24 using light beams generated by the four optical scanning devices 11, 12, 13, and 14 based on the respective image data. After that, multi-transfer is performed on a recording material to produce one full color image.

A color image reading apparatus including, for example, a CCD sensor may be used as the above-mentioned external device 52. In this case, a color digital copying machine is composed of the color image reading apparatus and the color image forming apparatus 60.

Note that, according to the present invention, the optical scanning device described in the first embodiment, the second embodiment, or the third embodiment is applied to the color image forming apparatus. Of course, the optical scanning device may be applied to a monochrome image forming apparatus.

According to the present invention, as described above, the BD lens is composed of the anamorphic lens and the conjugate point with the BD slit within the sub-scanning section is set between the aperture stop and the deflection surface of the optical deflector. Therefore, the surface tilt correction function to the deflection surface is provided, positions on the BD slit in the sub-scanning direction at a time when a plurality of BD light fluxes cross the BD slit are made to be substantially the same, and the spot length on the BD sensor surface can be set to a predetermined value or less. Thus, it is possible to realize an optical scanning apparatus in which an error of the write start position on the photosensitive drum surface is small and an image with high definition can be obtained.

Also, according to the present invention, it is possible to realize an image forming apparatus capable of reducing a color shift caused in a color image forming apparatus including a plurality of optical scanning devices as described above.

What is claimed is:

1. An optical scanning device comprising:
   an aperture stop for limiting a light flux width of a plurality of light fluxes in a sub-scanning direction;
   an optical deflector for deflecting the light fluxes passing through the aperture stop;
   a scanning optical system for guiding the plurality of light fluxes deflected by the optical deflector onto a surface to be scanned; and
   synchronous position detecting means for detecting the plurality of light fluxes deflected by the optical deflector to obtain a synchronous signal, which includes a synchronous detection sensor, wherein:
   the synchronous position detecting means further includes an imaging element and a slit for synchronous position detection, the slit being provided between the imaging element and the synchronous detection sensor; and
   a conjugate point of a slit surface of the slit is set between a deflection surface of the optical deflector and the aperture stop within a sub-scanning section by the imaging element.

2. An optical scanning device according to claim 1, wherein when a beam length of the light fluxes on the synchronous detection sensor in the sub-scanning direction is assumed to be Wss and a length of the synchronous detection sensor in the sub-scanning direction is assumed to be hs, a condition represented by $$0.05 \times hs = Wss = 0.8 \times hs$$

is satisfied.

3. An optical scanning device comprising:
   an aperture stop for limiting a light flux width of a plurality of light fluxes in a sub-scanning direction;
   an optical deflector for deflecting the light fluxes passing through the aperture stop;
   a scanning optical system for guiding the plurality of light fluxes deflected by the optical deflector onto a surface to be scanned; and
   synchronous position detecting means for detecting the plurality of light fluxes deflected by the optical deflector to obtain a synchronous signal, which includes a synchronous detection sensor, wherein:
   the synchronous position detecting means further includes an imaging element and a slit for synchronous detection, the slit being provided between the imaging element and the synchronous detection sensor; and
   when a beam length of the light fluxes on the slit in the sub-scanning direction is assumed to be Wss and a length of the slit in the sub-scanning direction is assumed to be hs, a condition represented by $$0.05 \times hs = Wss = 0.8 \times hs$$

is satisfied.

4. An optical scanning device according to claim 1, wherein when a distance between an incident surface of the imaging element and the conjugate point with the slit is assumed to be P and a distance between the aperture stop and the incident surface of the imaging element is assumed to be L, a condition represented by $$0.1 \times L = P = 0.9 \times L$$

is satisfied.

5. An optical scanning device according to claim 1, wherein the imaging element includes an anamorphic lens.

6. An optical scanning device according to claim 1, wherein the synchronous detection sensor is disposed on a separate optical path different from an optical path of the light fluxes traveling to the object surface.

7. An optical scanning device according to claim 1, wherein the synchronous detection sensor detects the synchronous signal for each of the plurality of light fluxes.

8. An optical scanning device comprising:
   an aperture stop for limiting a light flux width of a light flux in a sub-scanning direction;
   an optical deflector for deflecting the light flux passing through the aperture stop;
   a scanning optical system for guiding the light flux deflected by the optical deflector onto a surface to be scanned; and
   synchronous position detecting means for detecting the light flux deflected by the optical deflector to obtain a synchronous signal, which includes a synchronous detection sensor, wherein:
   the synchronous position detecting means further includes an imaging element and a slit for synchronous position detection, the slit being provided between the imaging element and the synchronous detection sensor; and
   a conjugate point of a slit surface of the slit is set between a deflection surface of the optical deflector and the aperture stop within a sub-scanning section by the imaging element.

9. An optical scanning device according to claim 8, wherein when a beam length of the light fluxes on the slit in the sub-scanning direction is assumed to be Wss and a length of the slit in the sub-scanning direction is assumed to be hs, a condition represented by $$0.05 \times hs = Wss = 0.8 \times hs$$

is satisfied.

10. An image forming apparatus comprising:

an optical scanning device according to any one of claims 1 to 9;

a photosensitive member located on an object surface;

a developing unit for developing as a toner image an electrostatic latent image formed on the photosensitive member by a light flux for scanning from the optical scanning device;

a transferring unit for transferring the developed toner image to a material to be transferred;

a fixing unit for fixing the transferred toner image to the material to be transferred; and a print controller for converting code data input from an external device into an image signal and outputting the image signal to the optical scanning device.

* * * * *